J. H. WHITNEY.
Harvester-Rake.

No. 163,831. Patented May 25, 1875.

Witnesses,
H. W. Dodge
Thos Houghton.

Inventor,
John H. Whitney
by Dodge & Son
Attys

THE GRAPHIC CO. PHOTO-LITH. 39 & 41 PARK PLACE, N.Y.

UNITED STATES PATENT OFFICE.

JOHN H. WHITNEY, OF ST. LOUIS, MISSOURI, ASSIGNOR TO SUMNER & WHITNEY MANUFACTURING COMPANY, OF SAME PLACE.

IMPROVEMENT IN HARVESTER-RAKES.

Specification forming part of Letters Patent No. 163,831, dated May 25, 1875; application filed November 17, 1874.

*To all whom it may concern:*

Be it known that I, JOHN H. WHITNEY, of St. Louis, in the county of St. Louis and State of Missouri, have invented certain Improvements in Harvester-Rakes, of which the following is a specification:

My invention relates to rakes for use on harvesters; and it consists of a canvas apron having a series of rods with teeth attached, secured upon the canvas, with a guide attached to each of the rods to regulate and control the motion of the teeth. It further consists in a series of rods arranged to support the grain as it falls upon the apron, together with certain details of construction, as hereinafter more fully described.

Figure 1:
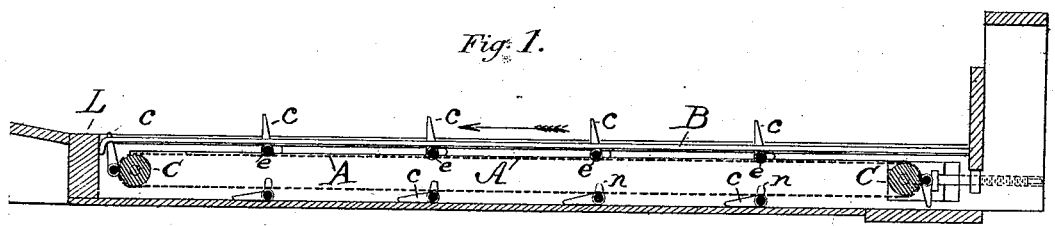
Figure 3:
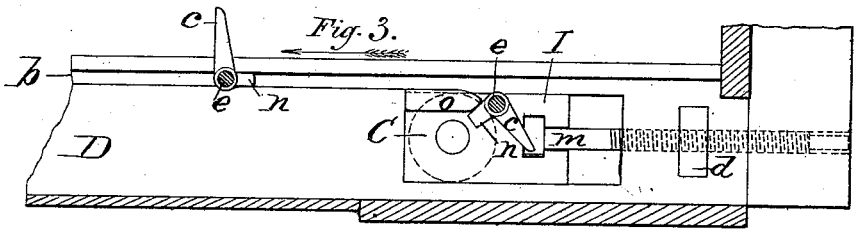
Figure 2:
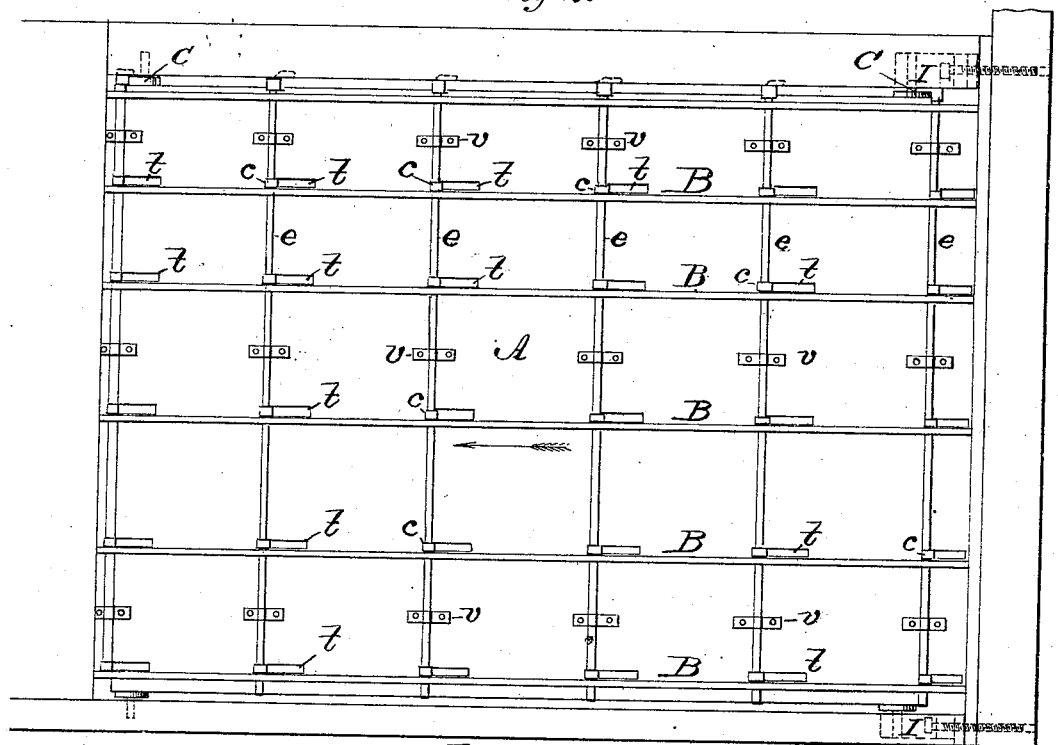
Figure 4:
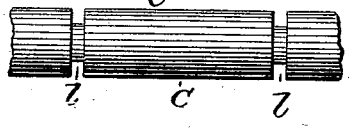

Figure 1 is a longitudinal vertical section of a rake made on my plan. Fig. 2 is a top plan view, and Figs. 3 and 4 are views of portion shown more in detail.

The object of this invention is to provide a rake that will effectually deliver the cut grain from the platform of a harvester to an automatic binder or other grain-receptacle, and not be liable to get out of order.

To construct my improved rake, I provide a canvas apron of the proper size, and fasten its ends together in the form of an endless belt, it being stretched around the rollers C, as shown in Fig. 1, and as represented in plan in Fig. 2. Upon this canvas I secure at intervals a series of rods, $e$, to each of which is rigidly attached a series of teeth, $c$, as shown in Figs. 1, 2, and 3, the rods $e$ being secured loosely upon the canvas by a series of leather strips, $v$, which, passing over the rods, are riveted to the canvas at each end, as shown in Fig. 1, or by any suitable means, thus leaving the rods $e$, with their teeth $c$, free to turn to and fro on the canvas. The rollers C, as shown in Fig. 4, are provided with annular grooves $l$, located at the same distance apart that the teeth $c$ are, on their rods $e$. Opposite each tooth $c$ there is cut a slot, $t$, in the canvas A, the object of which is to permit the teeth $c$ to fold or tip back through the slots $t$ into the grooves $l$ in the roller at the end next to the binder, as the teeth pass down at that end, so that they will readily draw down out of the grain—they standing in a vertical or slightly backwardly-inclined position at the time of leaving the grain. To keep the teeth in an upright position while traveling across the platform, there is secured to the end of each rod $e$ an arm, $n$, as shown in Figs. 1 and 3, and which travels or slides in a groove, $b$, made for them in the inner face of a vertical board or bar, D, arranged along the rear side of the platform, this arm $n$ projecting at right angles backward from the teeth $c$. This arm $n$ may be formed by simply bending the end of the rod $e$ itself at a right angle, or it may be formed of a separate piece, and be rigidly attached to the rod, as may be most convenient. The front roller C is so located that the teeth $c$ will be brought up against a bar, L, which prevents them from sweeping around in a radial position, and as the groove $b$ stops at the roller, thereby freeing the arm $n$, the teeth $c$ are drawn down out of the grain in a standing or vertical position, whereby they are freed from the straw or grain, and prevented from drawing any of the latter down with them. The other roller C, at the opposite end, is mounted in adjustable blocks I, as shown in Fig. 3, upon the upper inner faces of which is a projection, $o$, against which the arm $n$ strikes as the canvas brings the rods $e$ up around the roller, thereby causing the teeth $c$ to turn to an upright position as they are brought to the top, when the arm $n$ enters the groove $b$ as the canvas moves forward. A screw-rod, $m$, passes through a stationary nut, $d$, secured in the frame, as shown in Fig. 3, this rod having an enlarged circular head engaging in a recess in the block I, so that by turning this bolt $m$ the block I may be adjusted at will to keep the canvas properly stretched and prevent it from slipping on the rollers C.

To prevent the weight of the grain from causing the canvas to sag I arrange over it, lengthwise of the platform, a series of smooth rods or bars, B, as shown in Figs. 1 and 2, they being secured at each end to the framework of the platform. These bars B I prefer to locate nearer together at the front edge of the platform, in order the better to support the butt-ends of the straw; and preferably, they are so located that the rows of teeth shall pass close alongside of them, as represented in Fig. 2. These rods B also serve to strip the grain from the descending teeth as they draw down below the canvas, and serve as ways on which the grain is shoved forward, over the openings through which the teeth descend, to the binder.

As shown in Fig. 1, the platform will be covered underneath the canvas, to protect the latter and the rake-teeth from being injured or interfered with by roots, stones, or other obstacles below.

Motion may be imparted to the rollers, and thereby to the rake, by any suitable connection with the operating or driving mechanism of the reaper.

By these means I am enabled to make a simple, strong, and efficient rake, that is especially adapted to operate in connection with an automatic grain-binding machine, and which may also be used on any harvester where it is desired to have a continuous delivery of grain from the platform.

I am aware that a canvas apron having teeth attached rigidly and projecting radially from its surface, has been described, and also that endless chains and straps having transverse rods with projecting teeth attached thereto, with guides to hold them upright, have been shown and described in patents; and therefore I do not claim either of these, separately considered; but What I do claim is—

1. The series of rods $e$, each having a series of teeth, $c$, rigidly attached, with a guiding-arm, $n$, said rods $e$ being attached to an endless canvas, A, arranged to carry the same, and cause the arm $n$ to travel in the groove $b$, substantially as and for the purpose set forth.

2. The canvas A, provided with the slots $t$, in combination with the grooved roll C and the tilting or pivoted teeth $c$, all constructed to operate as set forth.

3. In combination with the canvas A, provided with the pivoted rods $e$ and their teeth, the rods B arranged to support the grain and deliver it from the platform while the teeth are being drawn down out of the grain, in the manner shown and described.

4. The adjustable bearings or blocks I, provided with the projections $o$, in combination with the tilting rake-teeth $c$, substantially as set forth.

JOHN H. WHITNEY.

Witnesses:
W. C. DODGE,
THOS. HOUGHTON.